(12) United States Patent
Ryan

(10) Patent No.: US 12,453,579 B2
(45) Date of Patent: Oct. 28, 2025

(54) SMALL GAUGE OPHTHALMIC INSTRUMENT AND METHOD

(71) Applicant: Edwin Ryan, St. Paul, MN (US)

(72) Inventor: Edwin Ryan, St. Paul, MN (US)

( * ) Notice: Subject to any disclaimer, the term of this patent is extended or adjusted under 35 U.S.C. 154(b) by 0 days.

(21) Appl. No.: 15/771,991

(22) PCT Filed: Oct. 28, 2016

(86) PCT No.: PCT/US2016/059554
§ 371 (c)(1),
(2) Date: Apr. 27, 2018

(87) PCT Pub. No.: WO2017/075514
PCT Pub. Date: May 4, 2017

(65) Prior Publication Data
US 2019/0059936 A1   Feb. 28, 2019

Related U.S. Application Data

(60) Provisional application No. 62/248,096, filed on Oct. 29, 2015.

(51) Int. Cl.
*A61B 17/34* (2006.01)
*A61B 17/32* (2006.01)
(Continued)

(52) U.S. Cl.
CPC .......... *A61B 17/3423* (2013.01); *A61B 17/32* (2013.01); *A61B 17/34* (2013.01);
(Continued)

(58) Field of Classification Search
CPC ..... A61B 17/3423; A61B 17/32; A61B 17/34; A61B 17/3421; A61B 2017/0047;
(Continued)

(56) References Cited

U.S. PATENT DOCUMENTS 4,565,396 A * 1/1986 Larimer ................ A61F 9/0061
294/1.2
10,117,703 B2 * 11/2018 Osher ...................... A61F 9/007
(Continued)

FOREIGN PATENT DOCUMENTS

CN      2287027 Y    8/1998
CN    103813827 A    5/2014
(Continued)

OTHER PUBLICATIONS

International Application Serial No. PCT/US2016/059554, International Search Report and Written Opinion mailed Jan. 3, 2017, 7 pgs.
(Continued)

*Primary Examiner* — Ashley L Fishback
*Assistant Examiner* — Chima U Igboko
(74) *Attorney, Agent, or Firm* — Schwegman Lundberg & Woessner, P.A.

(57) ABSTRACT

An ophthalmic instrument, and ophthalmic instrument system are shown with engaging features and mating features that interlock between an ophthalmic instrument and a cannula. Twisting motion of the ophthalmic instrument system is supported by the interlocking mating feature and engaging feature. Ophthalmic instruments are also shown that include a biasing device to urge support frame towards an extended location along a length of a small diameter instrument.

11 Claims, 7 Drawing Sheets

(51) Int. Cl.
*A61F 9/007* (2006.01)
*A61B 17/00* (2006.01)

(52) U.S. Cl.
CPC ...... *A61B 17/3421* (2013.01); *A61F 9/00736* (2013.01); *A61B 2017/00477* (2013.01); *A61B 2017/00544* (2013.01); *A61B 2017/347* (2013.01)

(58) Field of Classification Search
CPC ...... A61B 2017/0054; A61B 2017/347; A61B 2017/00477; A61B 2017/00544; A61F 9/007; A61F 9/00736; A61F 9/00772
See application file for complete search history.

(56) References Cited

U.S. PATENT DOCUMENTS

| | | |
|---|---|---|
| 2004/0186484 A1 | 9/2004 | Ryan |
| 2005/0033309 A1 | 2/2005 | Ryan |
| 2008/0033462 A1* | 2/2008 | Di Nardo ............... A61F 9/007 606/166 |
| 2008/0195135 A1* | 8/2008 | Attinger ............ A61F 9/00736 606/185 |
| 2008/0312662 A1* | 12/2008 | Hickingbotham .. A61F 9/00736 606/107 |
| 2014/0005640 A1* | 1/2014 | Shelton, IV ....... A61B 18/1442 606/1 |
| 2014/0128896 A1 | 5/2014 | Ryan |
| 2015/0148615 A1* | 5/2015 | Brennan ................ A61B 50/33 600/249 |
| 2017/0135723 A1* | 5/2017 | Zarembinski ...... A61B 17/3401 |
| 2018/0250164 A1* | 9/2018 | Ryan ................... A61F 9/00736 |

FOREIGN PATENT DOCUMENTS

| | | | |
|---|---|---|---|
| CN | 108472024 | A | 8/2018 |
| EP | 1886653 | A1 | 2/2008 |
| EP | 1955684 | A1 | 8/2008 |
| IN | 201817018804 | A | 9/2018 |
| JP | 2008194465 | A | 6/2008 |
| JP | 2011045604 | A | 3/2011 |
| JP | 2018531712 | A | 11/2018 |
| WO | WO-2013019859 | A1 | 2/2013 |

OTHER PUBLICATIONS

"International Application Serial No. PCT US2016 059554, International Preliminary Report on Patentability mailed May 11, 2018", 7 pgs.
European Application Serial No. 16860989.9, Extended European Search Report mailed Jun. 19, 2019, 10 pgs.
European Application Serial No. 16860989.9, Response filed Jan. 13, 2020 to Extended European Search Report mailed Jun. 19, 2019, 28 pgs.
Brazilian Application Serial No. BR1120180087700, Office Action mailed Jun. 5, 20, w/ English Claims, 5 pgs.
Chinese Application Serial No. 201680063502.6, Office Action mailed May 7, 2020, 18 pgs.
Australian Application Serial No. 2016343784, First Examination Report mailed Aug. 4, 2020, 4 pgs.
Australian Application Serial No. 2016343784, Response filed Dec. 8, 2020 to First Examination Report mailed Aug. 4, 2020, 10 pgs.
Brazilian Application Serial No. BR1120180087700, Response filed Sep. 11, 2020 to Office Action mailed Jun. 5, 2020, w/ English Claims, 19 pgs.
Chinese Application Serial No. 201680063502.6, Office Action mailed Jan. 5, 2021, w/ English translation, 17 pgs.
Chinese Application Serial No. 201680063502.6, Response filed Sep. 22, 2020 to Office Action mailed May 7, 2020, w/ English Claims, 15 pgs.
Indian Application Serial No. 201817018804, Office Action mailed Sep. 14, 2020, w/ English Translation, 6 pgs.
Japanese Application Serial No. 2018-520563, Notification of Reasons for Refusal mailed Oct. 13, 2020, w/ English translation, 10 pgs.
Chinese Application Serial No. 201680063502.6, Office Action mailed Jul. 5, 2021, w/ English translation, 11 pgs.
Chinese Application Serial No. 201680063502.6, Response filed Sep. 20, 2021 to Office Action mailed Jul. 5, 2021, w/ English claims, 5 pgs.
Indian Application Serial No. 201817018804, Response filed Mar. 12, 2021 to Office Action mailed Sep. 14, 2020, w/ English claims, 22 pgs.
Japanese Application Serial No. 2018-520563, Response filed Mar. 5, 2021 to Notification of Reasons for Refusal mailed Oct. 13, 2020, w/ English claims, 7 pgs.
Canadian Application Serial No. 3,002,205, Office Action mailed Dec. 7, 2021, 6 pgs.
Chinese Application Serial No. 201680063502.6, Decision of Rejection mailed Jan. 30, 2022, w/ English translation, 17 pgs.
"Canadian Application Serial No. 3,002,205, Response Filed Apr. 7, 2022 to Office Action mailed Dec. 7, 2021", 7 pgs.
"Chinese Application Serial No. 201680063502.6, Response Filed May 11, 2022 to Decision of Rejection mailed Jan. 30, 2022", w/ English Claims, 9 pgs.
"Canadian Application Serial No. 3,002,205, Office Action mailed May 25, 2022", 4 pgs.
"European Application Serial No. 16860989.9, Communication Pursuant to Article 94(3) EPC mailed Jun. 20, 2022", 9 pgs.
"Brazilian Application Serial No. BR 11 20180087700, Office Action mailed Aug. 4, 2022", w/ English Machine Translation, 8 pgs.

* cited by examiner

SMALL GAUGE OPHTHALMIC INSTRUMENT AND METHOD

CLAIM OF PRIORITY

This application is a U.S. National Stage Filing under 35 U.S.C. 371 from International Application No. PCT/US2016/059554, filed on Oct. 28, 2016, and published as WO 2017/075514 A1 on May 4, 2017, which claims the benefit of priority to U.S. Provisional Patent Application No. 62/248,096, filed on Oct. 29, 2015, each of which is hereby incorporated by reference herein in its entirety.

TECHNICAL FIELD

This invention relates to small gauge instruments typically used for surgical procedures such as surgery of the eye.

BACKGROUND

Ophthalmological surgery continues to evolve towards smaller instruments that produce smaller incisions. Common incision sizes may include 25 gauge or 27 gauge (approximately 0.41 mm diameter), and smaller instruments are likely in the future. The advantages of smaller incisions are multiple, including lessened trauma, faster healing, faster wound management (no sutures), and greater patient comfort.

Problems exist with the smaller instruments, however. The small diameter of the instruments makes them quite flexible, which is a disadvantage for the surgeon. With larger diameter instruments, there is very little "play", so the tips of the instruments go exactly where the surgeon desires that they go. With the smaller diameter instruments, the tips can move from their intended positions due to the bending or flexing of the fine wire-like instruments, which makes the surgeon feel a loss of control.

Bending or flexing of the small instruments is of particular concern in some procedures, for example, removal of peripheral vitreous, when the eye must be turned to allow viewing by the surgeon. Turning of the eye is accomplished by moving the instrument relative to the patient's head while a portion of the instrument remains inserted within a portion of the eye. Because the amount of flexing of the instrument is relatively large and unpredictable to the surgeon, precise repositioning of the eye becomes more difficult. In addition, delicate maneuvers such as peeling membranes from the retinal surface become significantly more difficult when instruments are too flexible causing imprecision of movements.

What is needed is an instrument design that accommodates increasingly small diameters, and still provides precise control without unwanted flexing.

DETAILED DESCRIPTION

Figure 1A:
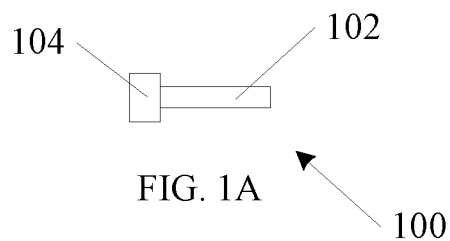
FIG. 1A-1C shows a trocar device and cannula.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

Figure 1B:
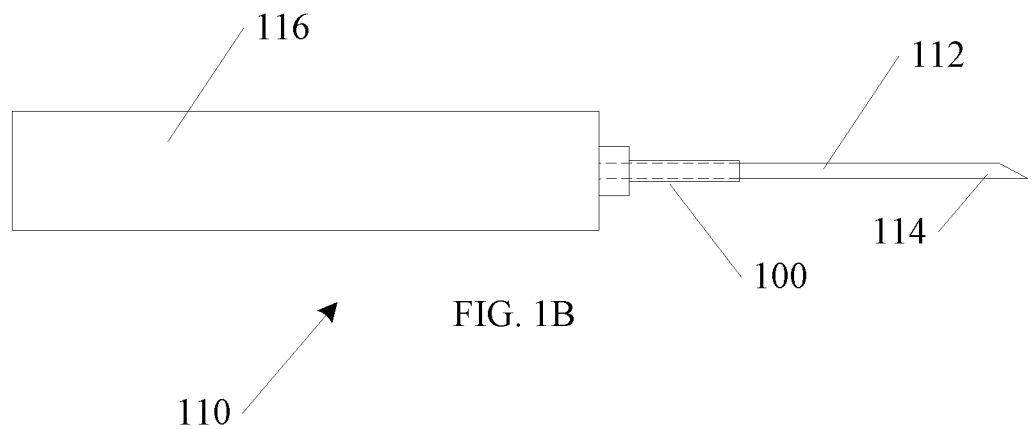

FIG. 1A shows a cannula 100. The cannula 100 includes a cannula shaft 102, and a head 104. FIG. 1B shows the cannula 100 in use with a trocar tool 110. The trocar tool 110 includes a blade 114 located at the end of a trocar shaft 112. The trocar shaft 112 and blade 114 are attached to an end of a handle 116. In operation, as shown in FIG. 1B, the cannula 110 is placed on the trocar shaft 112, with the trocar shaft 112 extending through a center opening of the cannula shaft 102 and head 104.

Figure 1C:
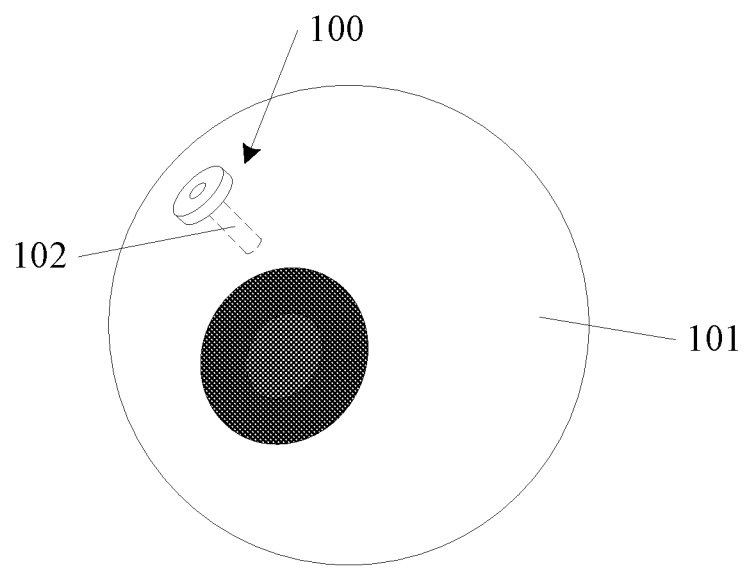

In FIG. 1C, the cannula 100 has been inserted into an eye 101. The blade 114 at the end of the trocar shaft 112 is used to make an incision in the eye 101, and allow insertion of the cannula shaft 102 of the cannula 100. The head 104 remains outside the eye 101, and is placed against an outer surface of the eye. Once in place, the trocar shaft 112 may be withdrawn, and various ophthalmic instruments may be inserted and removed from the eye 101 as needed during a procedure. After a procedure is complete, the cannula 100 is removed. As described above, it is desirable to have small incisions that heal faster, and are less invasive to the eye 101. A smaller cannula 100 is needed for smaller incisions, and as a result, smaller ophthalmic instruments must be used to enter through a smaller cannula.

Figure 2A:
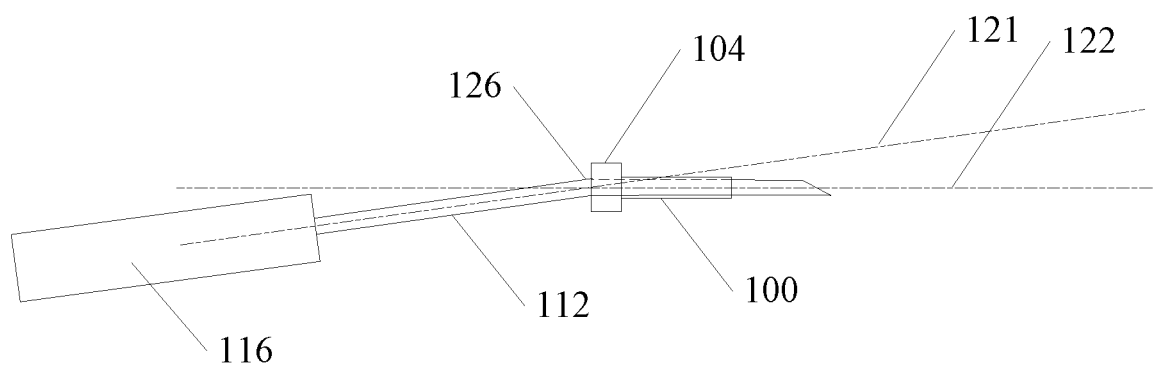
FIG. 2A shows flexing of a small gauge instrument according to the prior art.

FIG. 2A shows an ophthalmic instrument 116 according to the prior art. The ophthalmic instrument 116 includes a small gauge instrument shaft 112. FIG. 2A illustrates a condition that may occur during a procedure with a prior art instrument, where lateral force is required on the ophthalmic instrument 116. One example includes pushing on the ophthalmic instrument 116 to rotate the eye. As can be seen in FIG. 2A, the small gauge instrument shaft 112 may form a bend 126 at a location near the head 104 of the cannula 100 when lateral force is applied. A surgeon may be expecting a tip of the small gauge instrument shaft 112 to follow axis 121. However, because of the induced bend 126, the tip of the small gauge instrument shaft 112 instead follows axis 122.

Figure 2B:
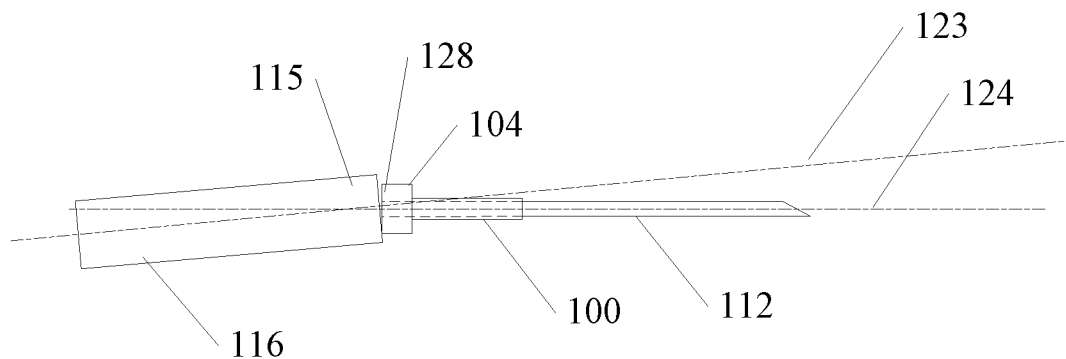
FIG. 2B shows another example of flexing of a small gauge instrument according to the prior art.

FIG. 2B shows a different scenario, however an unwanted bend 128 is still present. Even with a handle 115 of the ophthalmic instrument 116 abutting the head 104 of the cannula 100, a lateral force may induce a bend 128. As in FIG. 2A, a surgeon may be expecting a tip of the small gauge instrument shaft 112 to follow axis 123. However, because of the induced bend 128, the tip of the small gauge instrument shaft 112 instead follows axis 124.

Figure 3:
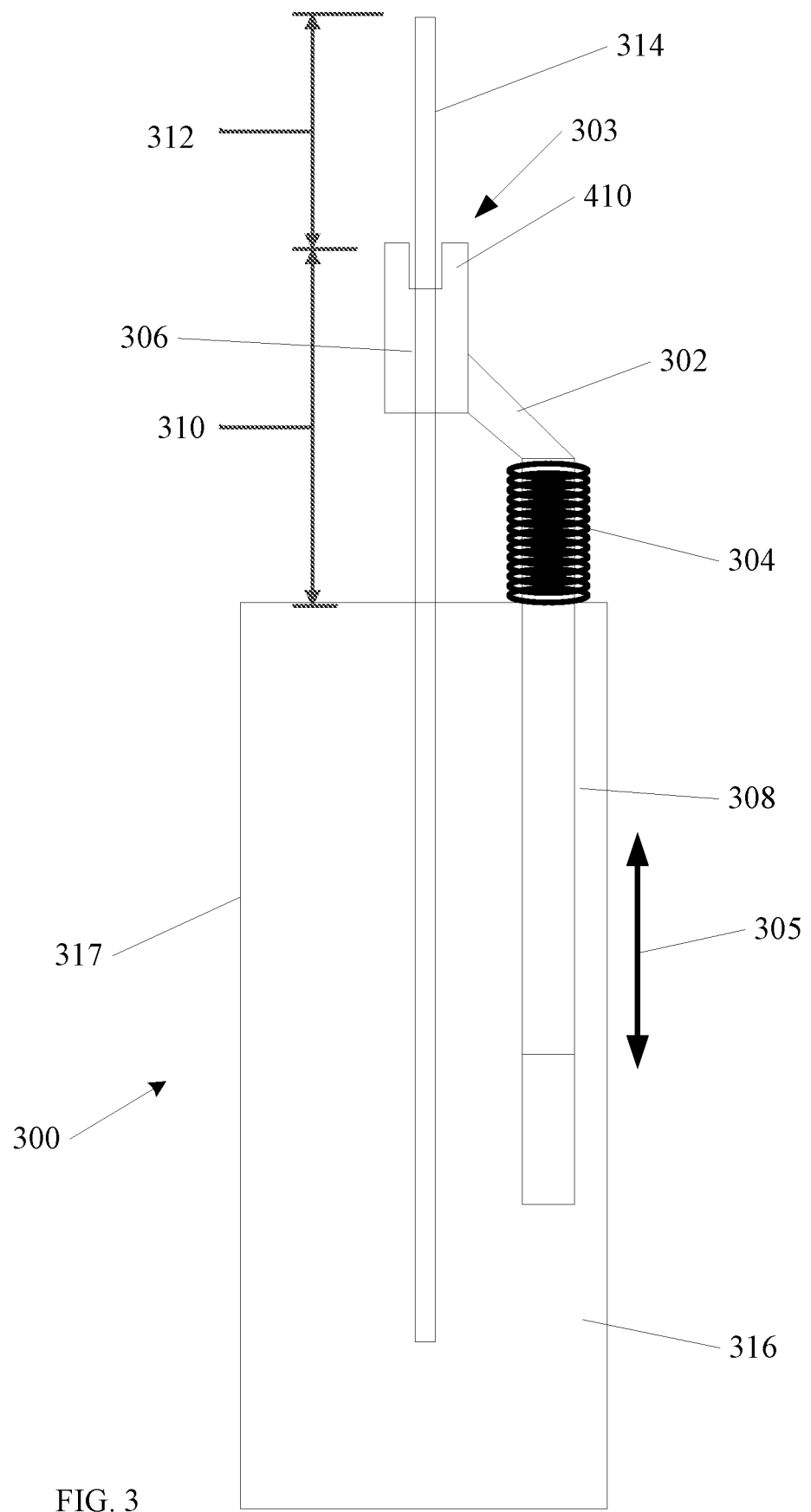
FIG. 3 shows an ophthalmic instrument according to an embodiment of the present invention.

FIG. 3 shows one example of an ophthalmic instrument 300 according to an embodiment of the invention. A base unit 316 is shown with a lateral gripping surface 317. A small diameter instrument 314 is shown extending from the base unit 316. A first length 312, and a second length 310 are shown. As will be discussed below, in one example, the first length 312, and the second length 310 are variable during use of the ophthalmic instrument 300.

FIG. 3 also shows a slidable support frame 302 that includes a medial portion 301, guide portion 307. In one example, a distal end 303 of the slidable support frame 302 includes an engaging feature 410. The function of the engaging feature 410 is discussed in more detail below with regard to FIGS. 4A and 4B.

In the example of FIG. 3, a guide portion 307 of the slidable support frame 302 forms a close tolerance fit interface 308 between the slidable support frame 302 and the base unit 316. The interface 308 is adapted to allow axial slidable movement 305 of the support frame 302 within the base unit 316, but allows minimal or no side to side play, in order to provide the highest practical amount of support. Similarly, in one example, the small diameter instrument 314 forms a close tolerance fit interface 306 between the small diameter instrument 314 and the slidable support frame 302. The interface 306 is adapted to allow axial slidable movement of the small diameter instrument 314 within the support frame 302, but allows minimal or no side to side play, in order to provide the highest practical amount of support. In other examples, due to interlocking between the support frame 302 and the cannula, a close tolerance fit at the interface 306 is not necessary, and support for twisting motion of the ophthalmic instrument 300 is provided by the support frame 302 and the cannula as described in more detail below.

FIG. 3 further shows a biasing device 304 to urge the support frame 302 towards an extended location along the length of the small diameter instrument 314. The biasing device allows motion of the support frame 302 along direction 305, while varying the first length 312 and the second length 310.

In use, the surgeon may push the ophthalmic instrument 300 towards the eye to move the small diameter instrument 314 deeper into the eye. At the same time, the biasing device 304 will gently push against a cannula and always urge the support frame 302 towards an extended location along the length of the small diameter instrument 314. If the small diameter instrument 314 is pushed deeper into the eye, the first length 312 is increased, while the second length 310 is decreased. If the surgeon withdraws the small diameter instrument 314, the biasing device 304 keeps the support frame 302 pressed against the cannula, and the first length 312 is decreased, while the second length 310 is increased. No manual adjustment, apart from moving the small diameter instrument 314 in or out of the eye, is required to vary the first length 310 and the second length 312.

In the illustration of FIG. 3, the biasing device 304 is a coil spring, however the invention is not so limited. In other examples, the biasing device 304 may include other metallic spring configurations apart from coils. In other examples, the biasing device 304 may include resilient materials such as compressible polymers.

In other examples, the biasing device 304 may include a pneumatic biasing device. In selected ophthalmic instrument systems, a pneumatic pressure source may already be supplied for other functionality. In such a configuration, using a portion of the pneumatic pressure source as a biasing device 304 is more easily accomplished. Further, a pneumatic biasing device may be adjustable using a regulator or other valve to provide varying levels of biasing force.

In FIG. 3, the support frame 302 is shown with a single frame member leading from the distal end 303 and the base unit 316 for ease of illustration. In other examples, two frame members may extend between the distal end and the base unit 316. Other examples may provide three frame members spaced apart at approximately 120 degrees about the small diameter instrument 314 to provide increased support against twisting in any direction.

Figure 4A:
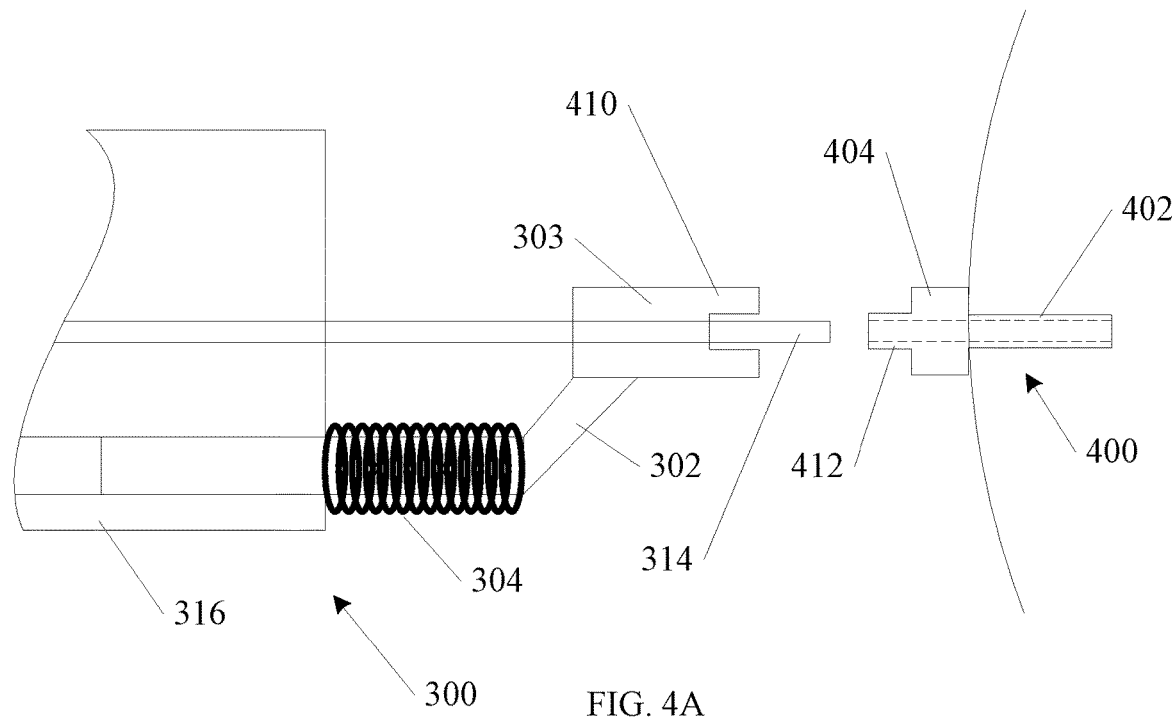
FIG. 4A shows an ophthalmic instrument system in use according to an embodiment of the present invention.
Figure 4B:
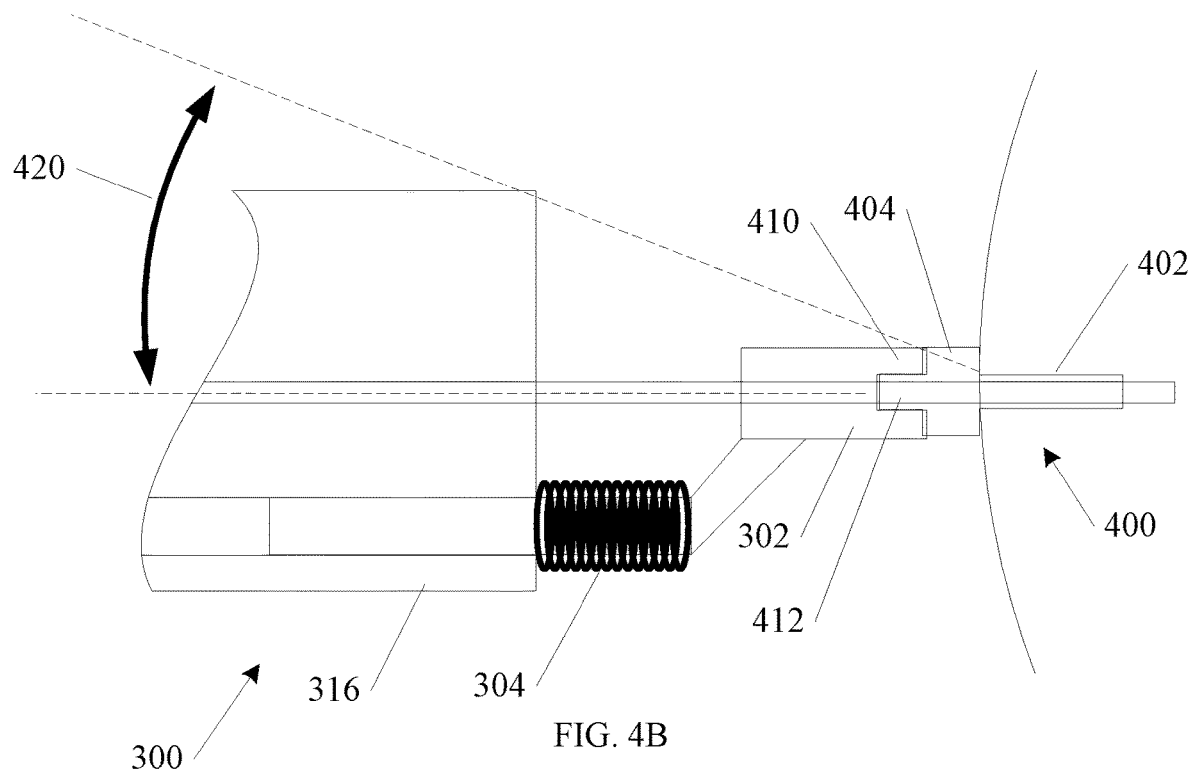
FIG. 4B shows another view of an ophthalmic instrument system in use according to an embodiment of the present invention.

FIGS. 4A and 4B illustrate the support function of one example of an ophthalmic instrument system. In FIG. 4A a cannula 400 and an ophthalmic instrument 300 are shown. The ophthalmic instrument 300 is similar to the ophthalmic instrument 300 from FIG. 3. The ophthalmic instrument 300 includes a support frame 302, and a biasing device 304. The support frame includes an engaging feature 410 on a distal end 303 of the support frame 302. The cannula 410 is shown with a cannula shaft 402, and a head 404. In the example of FIG. 4A, the head 404 further includes a mating feature 412 adapted to engage with the engaging feature 410.

In use, the small diameter instrument 314 is inserted through the cannula 400, and the mating feature 412 engages with the engaging feature 410 as shown in FIG. 4B. In the example shown, the mating feature 412 easily slides axially in and out of the engaging feature 410 along the axis of the small diameter instrument 314. However, when any twisting motion 420 is applied to the ophthalmic instrument 300, the combination of the mating feature 412 and the engaging feature 410 hold the cannula 400 in place coaxially with the support frame 302.

In FIG. 4A, the support frame 302 is shown in an extended configuration, with the biasing device 304 extended. In FIG. 4B, the support frame 302 is shown in a retracted configuration, with the biasing device 304 compressed.

In contrast to the conditions illustrated in FIGS. 2A and 2B, the configuration shown in FIGS. 4A and 4B does not put any bending stress on the small diameter instrument 314. All stresses from twisting motion 420 are borne by the interlocking mating feature 412 and engaging feature 410.

Figure 5A:
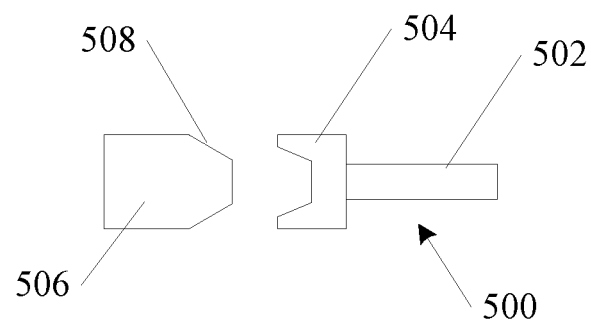
FIG. 5A shows a view of selected components of an ophthalmic instrument according to an embodiment of the present invention.
Figure 5B:
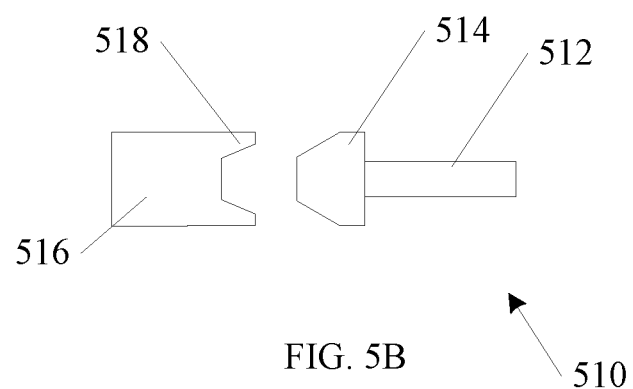
FIG. 5B shows another view of selected components of an ophthalmic instrument according to an embodiment of the present invention.

One of ordinary skill in the art, having the benefit of the present disclosure, will recognize that a number of different configurations of mating features 412 and engaging features 410 are possible. In one example, the mating features 412 and engaging features 410 include splines. FIGS. 5A and 5B show some additional examples of mating features 412 and engaging features 410. In FIG. 5A, a cannula 500 is shown with a cannula shaft 502, and a head 504. In the example of FIG. 5A, mating features of the head 504 are female and corresponding engaging features 508 of a support frame 506 are male. In FIG. 5B, a cannula 510 is shown with a cannula shaft 512, and a head 514. In the example of FIG. 5B, mating features 514 are male and corresponding engaging features 518 of a support frame 516 are female.

In one example, the engaging feature is a cup shape, and the corresponding mating feature is a cylinder shape that fits closely within the cup of the engaging feature. In one example it may be advantageous to have a combination of engaging feature and mating feature such as a cup and cylinder that provide lateral support, but do not restrain the cannula when an ophthalmic instrument is rotated about an axis of the small diameter instrument. If the cannula rotates about the axis of the small diameter instrument, the cannula may abrade the incision, and leakage may occur. However, if the engaging feature and mating feature allow such rotation about the axis of the small diameter instrument, then the cannula may remain rotationally fixed in the incision and reduce potential leakage.

This rotation is not to be confused with twisting motion, as illustrated in FIGS. 4A and 4B. Using the example of a cup and cylinder, a cannula will still be held coaxially with a support frame during twisting about the incision as shown in FIGS. 4A and 4B, however rotation of the small diameter instrument about an axis of the small diameter instrument would be unrestrained.

Although a biasing device is shown in the examples of FIGS. 4A and 4B, the invention is not so limited. Other examples may include mating features 412 and engaging features 410 on a cannula and support frame respectively, without a biasing device. Further, in one example, mating features 412 and engaging features 410 on a cannula and support frame respectively are included, however the support frame may not be slidable.

Figure 6A:
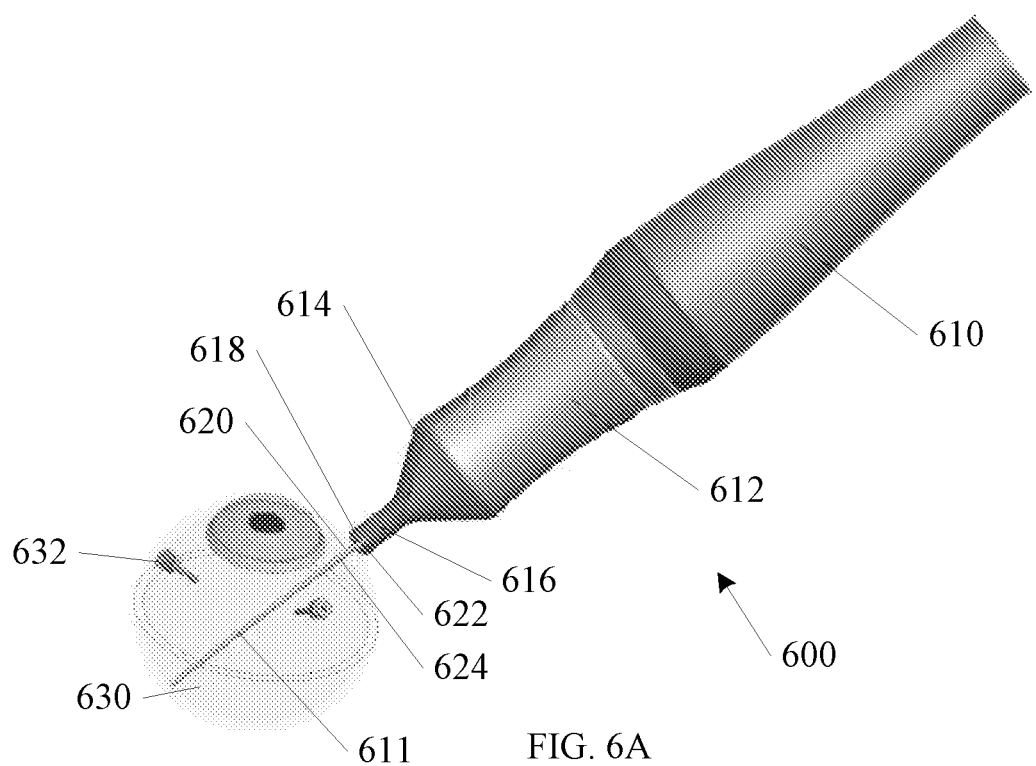
FIG. 6A shows an ophthalmic instrument system in use according to an embodiment of the present invention.
Figure 6B:
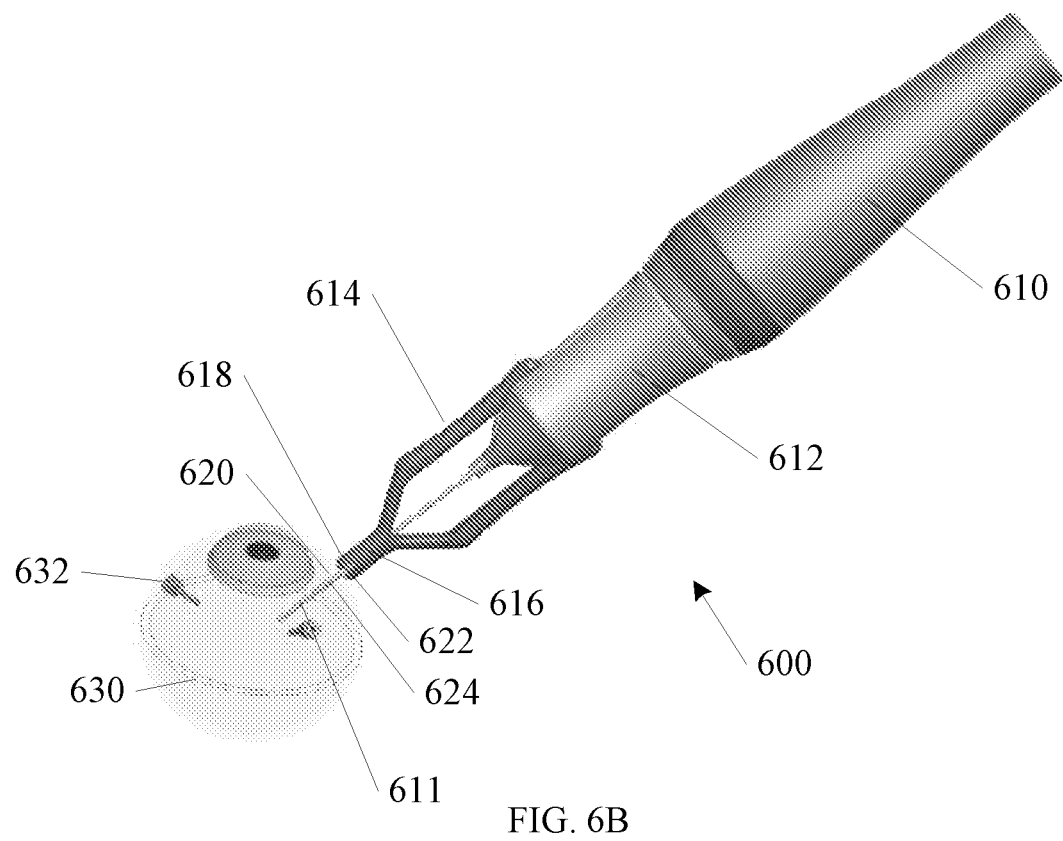
FIG. 6B shows another view of an ophthalmic instrument system in use according to an embodiment of the present invention.

FIGS. 6A and 6B show another example of an ophthalmic instrument system 600 according to an embodiment of the invention. In FIG. 6A, a base unit 610 is shown with a lateral gripping surface 612. A small diameter instrument 611 is shown extending from the base unit 610. A slidable support frame 614 is shown, having a distal end 616. In one example, the distal end 616 of the slidable support frame 614 includes an engaging feature 618.

A number of cannulas 632 are shown in place in an eye 630. A cannula 620 is shown with a mating feature 622 engaged with the engaging feature 618 of the slidable support frame 614. A cannula shaft 624 is shown extending into the eye 630.

In FIG. 6B, the slidable support frame 614 is shown in an extended condition with the distal end 616 biased against the cannula 620 and the engaging feature 618 of the support frame 614 remaining engaged with the mating feature 622 of the cannula 620. In FIG. 6B, with the support frame 614 extended, the small diameter instrument 611 is retracted to a location closer to a surface of the eye 630. As in examples described above, and twisting motion of the ophthalmic instrument system 600 is supported by the interlocking mating feature 622 and engaging feature 618. The cannula 620 is held coaxially with the distal end 616 of the support frame 614 to provide support to the small gauge instrument. In the example of FIGS. 6A and 6B, the support frame 614 is shown with two frame members extending between the base unit 610 and the distal end 616. As discussed above, other configurations of support frames 614, including one, three or more frame members are also within the scope of the invention.

Figure 7:
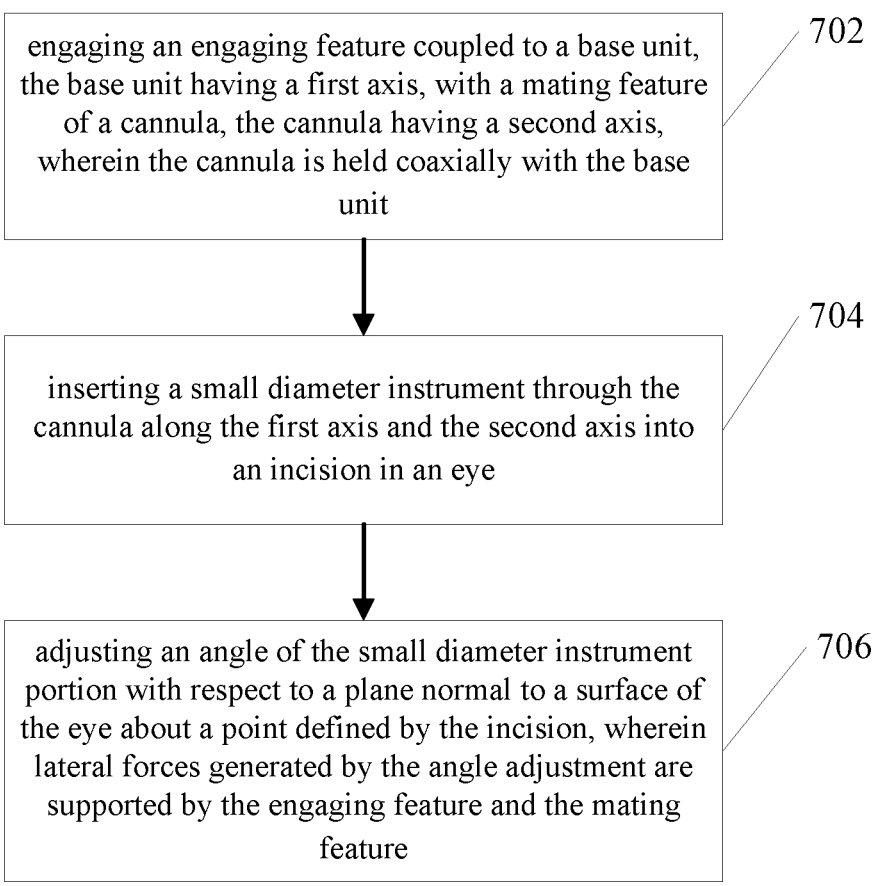
FIG. 7 shows a flow diagram of an example method according to an embodiment of the present invention.

FIG. 7 shows an example method of use according to one embodiment of the invention. In operation 702, an engaging feature that is coupled to a base unit is engaged with a mating feature of a cannula. The cannula is held coaxially with the base unit. In operation 704, a small diameter instrument is inserted through the cannula along a first axis of the base unit and a second axis of the cannula into an incision in an eye. As described above, the first axis and second axis are held coaxially. In operation 706, an angle of the small diameter instrument portion is adjusted with respect to a plane normal to a surface of the eye about a point defined by the incision. As a result of the configuration of the ophthalmic instrument, as described above, lateral forces generated by the angle adjustment are supported by the engaging feature and the mating feature.

To better illustrate the method and apparatuses disclosed herein, a non-limiting list of embodiments is provided here:

Example 1 includes an ophthalmic instrument system. The system includes a base unit having a lateral gripping surface, a small diameter instrument extending from the base unit, the small diameter instrument having a length, a slidable support frame extending from the base unit over the small gauge instrument along a support frame axis to provide varying levels of support to the small gauge instrument, an engaging feature on a distal end of the support frame, and a cannula for insertion into an eye, the cannula having a cannula axis, and a mating feature adapted to engage with the engaging feature, wherein when engaged with the support frame, the cannula is held coaxially with the support frame to further provide support to the small gauge instrument.

Example 2 includes the ophthalmic instrument system of example 1, further including a biasing device to urge the support frame towards an extended location along the length of the small diameter instrument.

Example 3 includes the ophthalmic instrument system of any one of examples 1-2, wherein the biasing device includes a coil spring.

Example 4 includes the ophthalmic instrument system of any one of examples 1-3, wherein the biasing device is at least partially pneumatically actuated.

Example 5 includes the ophthalmic instrument system of any one of examples 1-4, wherein the engaging feature includes one or more splines.

Example 6 includes the ophthalmic instrument system of any one of examples 1-5, wherein the engaging feature is female and the mating feature is male.

Example 7 includes the ophthalmic instrument system of any one of examples 1-6, wherein the engaging feature is cup shaped and the mating feature is cylindrical.

Example 8 includes an ophthalmic instrument system. The system includes a base unit having a lateral gripping surface, a small diameter instrument extending from the base unit, the small diameter instrument having a length, an engaging feature located at a distal end of the base unit, and a cannula for insertion into an eye, the cannula having a cannula axis, and a mating feature adapted to engage with the engaging feature, wherein when engaged with the base unit, the cannula is held coaxially with the base unit to further provide support to the small gauge instrument.

Example 9 includes the ophthalmic instrument system of example 8, wherein the engaging feature is located on a support sleeve extending from the base unit.

Example 10 includes the ophthalmic instrument system of any one of examples 8-9, wherein the support sleeve is slidable over the small gauge instrument to provide varying levels of support to the small gauge instrument.

Example 11 includes the ophthalmic instrument system of any one of examples 8-10, wherein the engaging feature includes one or more splines.

Example 12 includes the ophthalmic instrument system of any one of examples 8-11, wherein the engaging feature is female and the mating feature is male.

Example 13 includes the ophthalmic instrument system of any one of examples 8-12, wherein the engaging feature is cup shaped and the mating feature is cylindrical.

Example 14 includes a method, comprising engaging an engaging feature coupled to a base unit, the base unit having a first axis, with a mating feature of a cannula, the cannula having a second axis, wherein the cannula is held coaxially with the base unit, inserting a small diameter instrument through the cannula along the first axis and the second axis into an incision in an eye, and adjusting an angle of the small diameter instrument portion with respect to a plane normal to a surface of the eye about a point defined by the incision, wherein lateral forces generated by the angle adjustment are supported by the engaging feature and the mating feature.

Example 15 includes the method of example 14, further including extending the small diameter instrument through a slidable support frame and into the eye, and sliding the support frame freely along a length of the small diameter instrument, wherein the distal portion of the support frame includes the engaging feature, and is pressed to maintain contact with the mating feature of the cannula by a biasing device.

These and other examples and features of the present infusion devices, and related methods will be set forth in part in the above detailed description. This overview is intended to provide non-limiting examples of the present subject matter—it is not intended to provide an exclusive or exhaustive explanation.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An ophthalmic instrument system, comprising:
    a base unit having a lateral gripping surface;
    a small diameter instrument extending from the base unit, the small diameter instrument having a length and a longitudinal axis;
    a slidable support frame comprising:
        a guide portion extending into the base unit, wherein the guide portion has a longitudinal axis parallel to the longitudinal axis of the small diameter instrument,
        a medial portion extending distally from the base unit, wherein the medial portion has a longitudinal axis transverse to the longitudinal axis of the small diameter instrument;
    wherein the slidable support frame extending from the base unit over the small diameter instrument along a support frame axis to provide varying levels of support to the small diameter instrument, wherein the small diameter instrument forms a close tolerance fit interface between the small diameter instrument and the slidable support frame;
    an engaging feature on a distal end of the support frame; and
    a cannula for insertion into an eye, the cannula having a cannula axis, and a mating feature adapted to engage with the engaging feature, wherein when engaged with the support frame, the cannula is held coaxially with the support frame to further provide support to the small diameter instrument, wherein the mating feature and the engaging feature include a cylinder and a cup configuration with a cylinder shape that fits closely within the cup that provide lateral support, and provides free axial engagement and removal, and rotation without axial translation with respect to the cannula when the support frame is rotated about the cannula axis.

2. The ophthalmic instrument system of claim 1, further including a biasing device to urge the support frame towards an extended location along the length of the small diameter instrument.

3. The ophthalmic instrument system of claim 2, wherein the biasing device includes a coil spring.

4. The ophthalmic instrument system of claim 2, wherein the biasing device is at least partially pneumatically actuated.

5. The ophthalmic instrument system of claim 1, wherein the engaging feature is female and the mating feature is male.

6. The ophthalmic instrument system of claim 5, wherein the engaging feature is cup shaped and the mating feature is cylindrical.

7. An ophthalmic instrument system, comprising:
    a base unit having a lateral gripping surface;

a small diameter instrument extending from the base unit, the small diameter instrument having a length and a longitudinal axis;

a slidable support frame comprising:
   a guide portion extending into the base unit, wherein the guide portion has a longitudinal axis parallel to the longitudinal axis of the small diameter instrument,
   a medial portion extending distally from the base unit, wherein the medial portion has a longitudinal axis transverse to the longitudinal axis of the small diameter instrument;
   wherein the slidable support frame extending from the base unit over the small diameter instrument along a support frame axis to provide varying levels of support to the small diameter instrument, wherein the small diameter instrument forms a close tolerance fit interface between the small diameter instrument and the slidable support frame;
an engaging feature located at a distal end of the slidable support frame; and
a cannula for insertion into an eye, the cannula having a cannula axis, and a mating feature adapted to engage with the engaging feature, wherein when engaged with the base unit, the cannula is held coaxially with the base unit to further provide support to the small diameter instrument.

8. The ophthalmic instrument system of claim 7, wherein the engaging feature is located on a support sleeve extending from the base unit.

9. The ophthalmic instrument system of claim 8, wherein the support sleeve is slidable over the small diameter instrument to provide varying levels of support to the small diameter instrument.

10. The ophthalmic instrument system of claim 7, wherein the engaging feature is female and the mating feature is male.

11. A method, comprising:
   engaging one or more splines of an engaging feature coupled to a base unit, the base unit having a first axis, with a mating feature of a cannula, the cannula having a second axis, wherein the cannula is held coaxially with the base unit;
   inserting a small diameter instrument through the cannula along the first axis and the second axis into an incision in an eye, wherein the small diameter instrument is extended through a support frame than forms a close tolerance fit interface between the small diameter instrument and the support frame, wherein the splines of the engaging feature are located on a distal end of the support frame;
   the small diameter instrument extending from the base unit, the small diameter instrument having a length and a longitudinal axis;
   the slidable support frame comprising:
      a guide portion extending into the base unit, wherein the guide portion has a longitudinal axis parallel to the longitudinal axis of the small diameter instrument,
   a medial portion extending distally from the base unit, wherein the medial portion has a longitudinal axis transverse to the longitudinal axis of the small diameter instrument;
   adjusting an angle of the small diameter instrument with respect to a plane normal to a surface of the eye about a point defined by the incision, wherein lateral forces generated by the angle adjustment are supported by the engaging feature and the mating feature.

* * * * *